Figure 1:
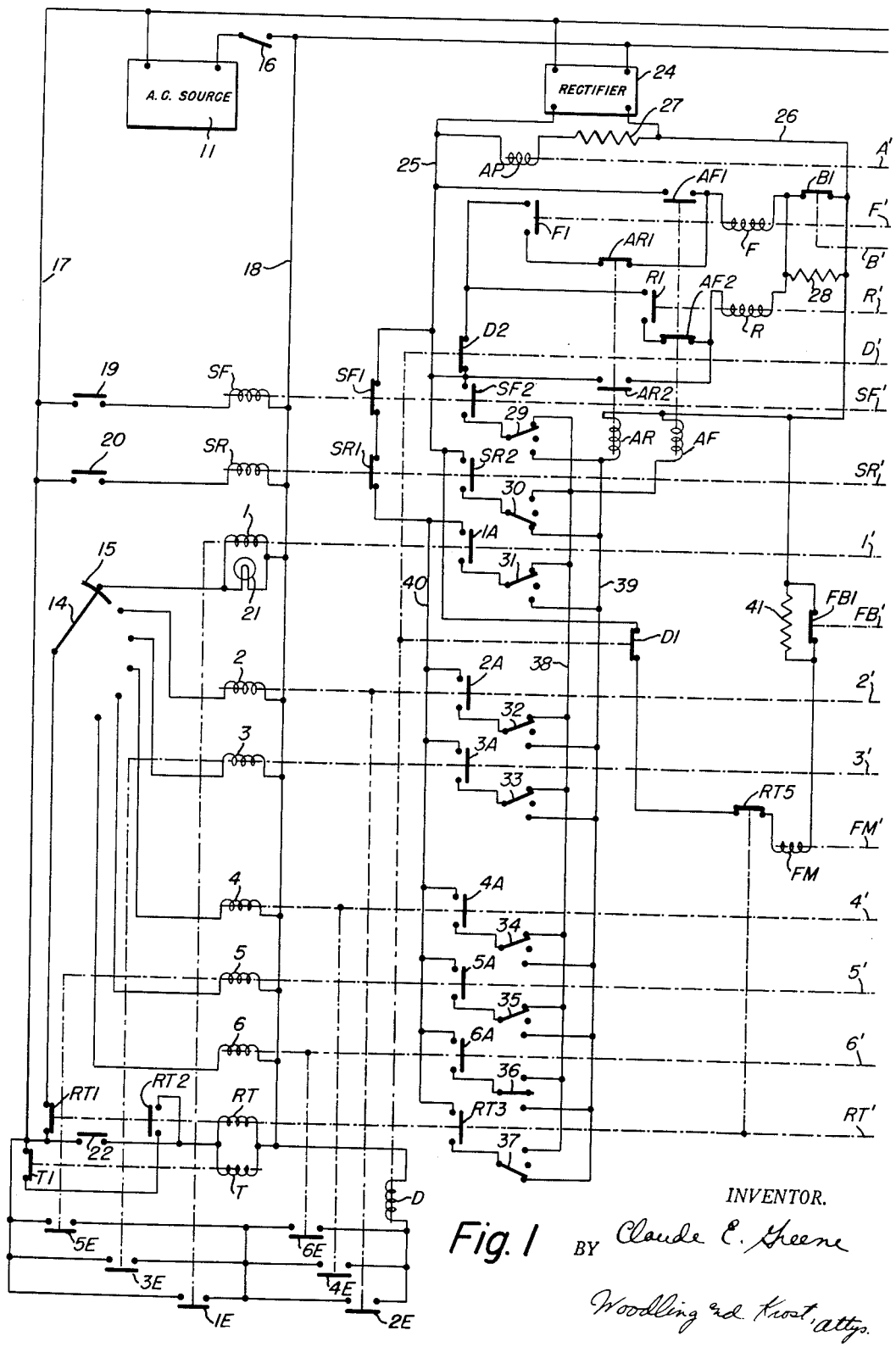

March 6, 1956

C. E. GREENE 2,737,620

MOTOR CONTROL CIRCUIT

Filed Nov. 29, 1950

2 Sheets-Sheet 1

INVENTOR.
BY Claude E. Greene
Woodling and Krost, attys.

United States Patent Office 2,737,620
Patented Mar. 6, 1956

2,737,620

MOTOR CONTROL CIRCUIT

Claude E. Greene, Sidney, Ohio, assignor to The Monarch Machine Tool Company

Application November 29, 1950, Serial No. 198,120

16 Claims. (Cl. 318—258)

The invention relates in general to control circuits for electrical motors and more particularly to control circuits for direct current motors operable from a rectifier system wherein rapid changes of speed of direction of rotation are required.

The motor control circuit has been specifically shown as being especially applicable to a turret lathe type of machine tool and as such it is an improvement on the circuit shown and described in the copending application of Claude E. Greene and Robert B. Lesher, Serial No. 12,586, filed March 2, 1948, now Patent No. 2,656,589, dated October 27, 1953. The cooperation of the circuit with any particular machine is made merely by way of example to illustrate the desirability of certain functions. In the aforementioned application the spindle motor of the lathe was adapted to have a different speed condition for each of the six positions of the turret, and these speed conditions could be either forward or reverse at any rotational speed. The former circuit provided that the spindle motor was dynamically braked to a preset low speed, and then accelerated to its new speed condition with each indexing of the turret. Further, a twelve position switch for the six position turret was provided in order that the spindle motor could be taken out of the reverse rotational condition. Consequently, an object of the invention is to provide a motor control circuit for a turret lathe wherein a six position turret actuates only a six position tap switch.

Another object of the invention is to provide a motor control circuit wherein a direct current type motor is operable from a power translator which translates power only unidirectionally to the motor, and wherein a slow-down relay is serially connected between the motor and the power translator to deenergize the relay during deenergization periods of the motor, and this slow-down relay controlling a dynamic braking circuit.

Another object of the invention is to provide a rotary tap switch operated by the turret of a turret lathe which switch is of the shorting type so that always at least one of six relays is energized by the tap switch to control the energization to the spindle motor of the lathe. This shorting type tap switch is also designed to provide that the field winding of the spindle motor is never without energization.

Another object of the invention is to provide auxiliary forward and reverse relays in addition to the normal forward and reverse relays controlling a spindle motor of a lathe so that the forward relay or the reverse relay, as the case may be, will remain energized, despite indexing of the turret of the lathe, until an indexing position of the turret is reached which calls for the opposite rotational direction of the spindle motor.

Another object of the invention is to provide a dropout relay energizable upon simultaneous actuation of adjacent contacts on a rotary switch controlled by the turret of the lathe so that this dropout relay may provide a full field energization condition on the saddle feed motor of the lathe, additionally to brake this feed motor, and additionally to stop the spindle motor should a selector switch for the spindle motor be in the "off" position.

Figure 2:
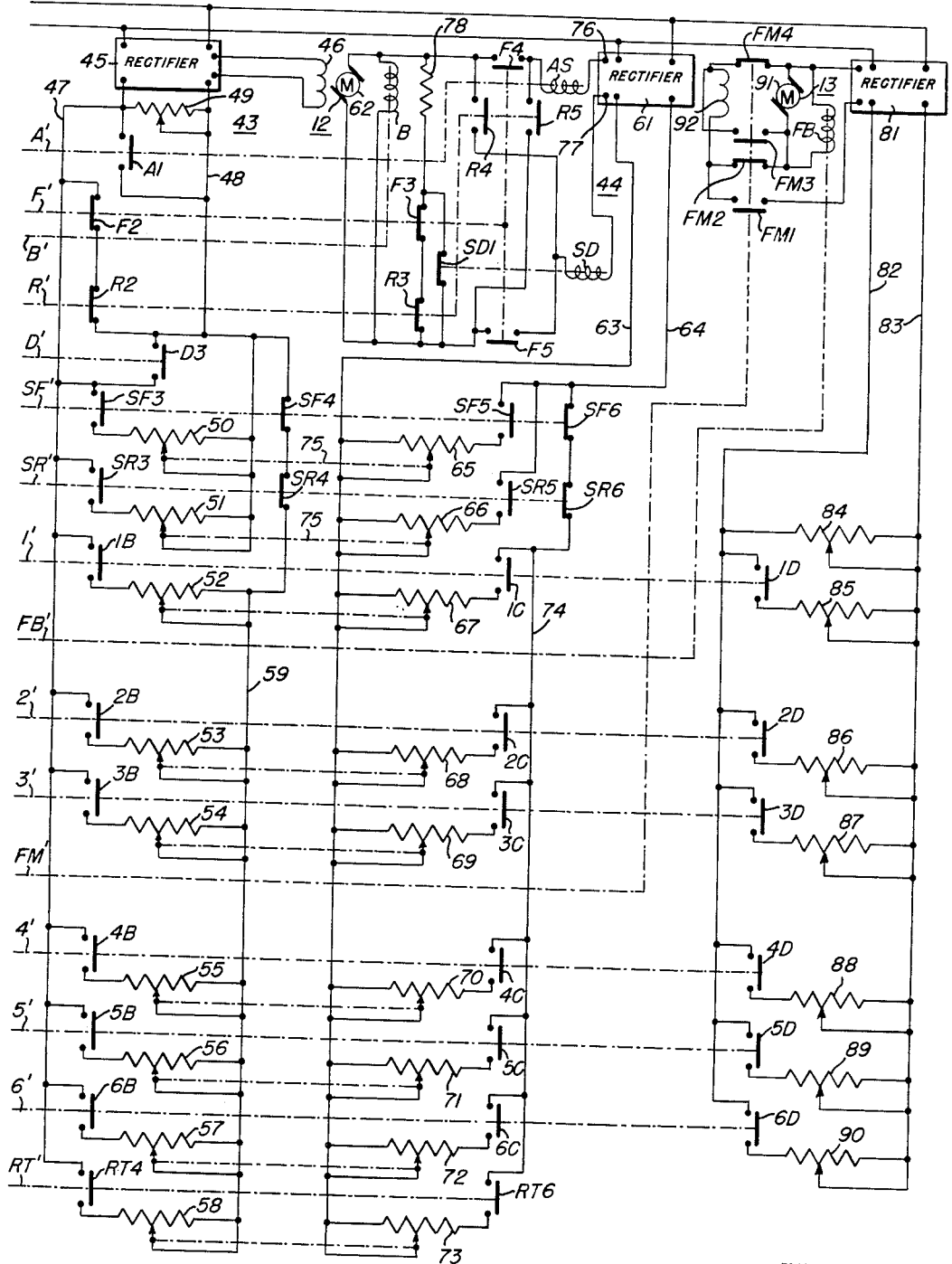

Other objects and a fuller understanding of the invention may be had by referring to the following description and claims, taken in conjunction with the accompanying drawings, in which:

Figures 1 and 2, when laid side by side, show the complete schematic wiring diagram for the motor control circuit.

The circuit of Figures 1 and 2 show a motor control circuit operable from an A. C. source 11 to control a spindle motor 12 and a feed motor 13. The spindle motor 12 may be a motor which drives the headstock spindle of a turret lathe, and the feed motor 13 may be a motor such as will drive the saddle carrying the turret of this turret lathe, such as is shown in the aforementioned copending application. The turret of such lathe is connected to operate a rotary tap switch 14 having six positions and having a shorting type movable contact 15. This movable contact 15 is designed to electrically contact the next succeeding contact before breaking the preceding contact. The A. C. source 11 is designed to energize through a switch 16 the lines 17 and 18. Connected across the lines 17 and 18 are the serially connected normally open cross slide in switch 19 and the cross slide in or slide forward relay SF. A normally open cross slide out switch 20 and a cross slide out or slide reverse relay SR are serially connected across the lines 17 and 18. A dropout relay D is connected across the lines 17 and 18 through a series-parallel combination of normally open relay contacts. This series-parallel combination of relay contacts includes a first paralleled group of contacts 1E, 3E, and 5E, and a second paralleled group of contacts 2E, 4E, and 6E. These two paralleled groups of contacts are connected in series with each other and with the dropout relay D across the lines 17 and 18. Six numbered relays respectively numbered 1 to 6 are connected across the lines 17 and 18 through the six contacts on the rotary tap switch 14 and through a normally closed reverse tap relay contact RT1. The first relay 1 is shown as having an indicator lamp 21 connected thereacross, and it will be understood that all of these six numbered relays may be provided with a lamp to indicate when they are energized. A reverse tap relay RT is connected across the lines 17 and 18 through a normally open reverse tap pick-up switch 22, and may also be connected across these lines through a normally open reverse tap hold-in contact RT2 and through a normally closed time relay contact T1. A timer relay T is connected in parallel with the reverse tap relay RT, and actuates the aforementioned contact T1.

A control rectifier 24 is energizable from the lines 17 and 18 and is adapted to supply rectified energy to the lines 25 and 26. A field accelerating relay A has two coils for actuation thereof. One of these coils is a parallel coil AP connected across the lines 25 and 26 through a current limiting resistor 27. A forward relay F is connected across the lines 25 and 26 through the serially connected normally open auxiliary forward relay contact AF1 and a normally closed braking relay contact B1. This forward relay F may also be connected across the lines 25 and 26 through the contact B1, a normally closed auxiliary reverse relay contact AR1, a normally open forward relay contact F1, and a normally closed dropout relay contact D2. A current limiting resistor 28 is connected in parallel with the contact B1. A reverse relay R is connected across the lines 25 and 26 through the contact B1, a normally closed auxiliary forward relay contact AF2, a normally open reverse relay contact R1, and the contact D2. The reverse relay R may also be connected across the lines 25 and 26 through the contact B1 and a normally open auxiliary relay contact AR2.

A series of nine selector switches numbered 29 to 37, inclusive, each have three positions, a forward, an off, and a reverse position. These three positions for any one switch are shown consecutively from top to bottom on the Figure 1. The forward positions are connected to a forward line 38 and the reverse positions of the selector switches are connected to a reverse line 39. An auxiliary reverse relay AR is connected across the lines 25 and 26 through the reverse position of the selector switch 29 and through a normally open slide forward relay contact SF2. The auxiliary reverse relay AR may also be connected across the lines 25 and 26 through the reverse position of the selector switch 30 and through a normally open slide reverse relay contact SR2. An auxiliary forward relay AF is connected across the lines 25 and 26 through the forward position of the selector switch 29 and the contact SF2, and this relay may also be connected across the lines 25 and 26 through the forward position of the selector switch 30 and the contact SR2.

A branch line 40 is connected to the line 25 through the normally closed serially connected contacts SF1 and SR1 of the slide forward and slide reverse relays, respectively. The selector switches 31 to 36 have connected in series therewith a normally open contact of the numbered relays and these contacts are designated 1A to 6A, respectively. The selector switch 37 also has connected in series therewith a normally open contact RT3 of the reverse tap relay RT. It will thus be seen that the auxiliary reverse or auxiliary forward relays AR and AF may be connected across the lines 26 and 40 through any one of the selector switches 31—37 whenever the appropriate relay contact in series therewith is closed. A feed motor relay FM is connected across the lines 25 and 26 through a normally closed dropout relay contact D1, a normally closed reverse tap relay contact RT5, and a current limiting resistor 41. A normally closed feed brake relay contact FB1 is connected in parallel with resistor 41.

The Figure 2 shows a continuation of the motor control circuit and included thereon is a field energization circuit 43 and an armature energization circuit 44. The field energization circuit 43 includes a field rectifier 45 energized from the lines 17 and 18 and designed to supply rectified energy to a field winding 46 of the spindle motor 12. The field rectifier 45 may be controlled in a well known manner by placing varying amounts of resistance across control lines 47 and 48. This varying resistance may be used as a variable bias on a thermionic rectifier system. The field rectifier 45 may be so designed that when a short circuit is placed across the control lines 47 and 48 the rectifier delivers full field energization to the field winding 46. Consequently a minimum field rheostat 49 is connected across the lines 47 and 48. The rheostat 49 makes certain that some finite resistance is always across the lines 47 and 48 so that the field winding 46 always has some minimum value of excitation when the rectifiers 45 and 61 are energized. The field accelerating relay A has a normally open contact A1 connected across the lines 47 and 48. Also serially connected across the lines 47 and 48 are normally closed contacts F2 and R2 of the forward and reverse relays, respectively. A normally open dropout relay contact D3 is also connected across the lines 47 and 48. A series of nine field biasing rheostats 50 to 58, inclusive, are adapted to be connected to the field rectifier 45 for control thereof. The biasing rheostats 50 and 51 are adapted to be connected across the lines 47 and 48 through contacts SF3 and SR3, respectively, of the slide forward and slide reverse relays. A branch line 59 is connected to the control lines 48 through serially connected and normally closed contacts SF4 and SR4 of the slide forward and slide reverse relays, respectively. The rheostats 52 to 57, inclusive, are adapted to be connected across the lines 47 and 59 through normally open contacts of the numbered relays, namely the contacts 1B to 6B, inclusive. The biasing rheostat 58 is adapted to be connected across the lines 47 and 59 by normally open contact RT4 of the reverse tap relay RT.

The armature energization circuit 44 includes an armature rectifier 61 energizable from the A. C. lines 17 and 18 and supplying rectified energy to the armature 62 of the spindle motor 12. The armature rectifier 61 is controlled in output by the resistance placed across the control lines 63 and 64 in a manner similar to the way in which the field rectifier 45 was controlled. A series of nine armature biasing rheostats 65 to 73, inclusive, are adapted to be connected across the lines 63 and 64. The rheostat 65 is connected across the lines 63 and 64 by normally open contact SF5 of the slide forward relay SF. The biasing rheostat 66 is connected across the lines 63 and 64 by normally open contact SR5 of the slide reverse relay SR. A branch line 74 is connected to the control line 64 through serially connected normally closed contacts SF6 and SR6 of the slide forward and slide reverse relays, respectively. The biasing rheostats 67 through 72, inclusive, are adapted to be connected across the lines 63 and 74 through normally open contacts 1C to 6C, respectively. The biasing rheostat 73 is connected across the lines 63 and 74 through a normally open contact RT6 of the reverse tap relay RT. The corresponding field and armature biasing rheostats are mechanically connected as at 75 for coordinated actuation. This coordinated action is provided so that a single control knob controlling the two rheostats will first increase the armature energization up to a point corresponding to base speed of the spindle motor 12 and will thereupon successively reduce the energization supplied to the field winding 46 in order that speed greater than base speed may be established.

The rectified output from the armature rectifier 61 is supplied to the output terminals 76 and 77. The armature 62 is connected to the output terminal 76 through a series coil AS of the the field accelerating relay A and through a normally open contact F4 of the forward relay F. The armature 62 is connected to the output terminal 77 through a slowdown relay SD and a normally open contact F5 of the forward relay F. A braking relay B is connected across the armature 62. A dynamic braking resistance 78 is connected across the armature 62 by serially connected normally closed contacts F3 and R3 of the forward and reverse relays, respectively. A normally closed contact SD1 of the slowdown relay SD is connected in parallel with the serially connected contacts F3 and R3. The contacts F4 and F5 of the forward relay F are adapted to connect the motor armature 62 to the output terminals 76 and 77 in one polarity and connection of the armature to these terminals in the opposite polarity may be effected by the closure of normally open contacts R4 and R5 of the reverse relay R.

The Figure 2 further shows a feed rectifier 81 energizable from the lines 17 and 18 and supplying rectified energy to the feed motor 13. The feed rectifier 81 is controlled by the amount of resistance across control lines 82 and 83. A minimum value rheostat 84 is connected across the lines 82 and 83. Six feed biasing rheostats 85 to 90, inclusive, are adapted to be connected across the lines 82 and 83 by the closing of the appropriate one of normally open contacts 1D to 6D, inclusive.

The feed motor 13 has an armature 91 and a field winding 92. Normally closed feed motor relay contacts FM2 and FM4 are adapted to connect in series the armature 91 and the field winding 92 for a dynamic braking circuit. Normally open contacts FM1 and FM3 of the feed motor relay FM are adapted to connect the armature 91 and field winding 92 in series in the opposite sense to that effected by contacts FM2 and FM4, to thus establish energization of the feed motor 13 from the rectifier 81. A feed brake relay FB is connected across the armature 91.

Operation

The operation of the motor control circuit will be described in conjunction with a turret lathe which will better illustrate the reasons for providing the various functions. The turret of the turret lathe rotates the rotary tap switch 14, and this tap switch has been shown as being in the first position which would energize the first relay 1. The selector switch 31 for this relay has been shown as being in the forward position which means that the control circuits are set for the forward rotational direction of the spindle motor 12. The turret lathe may have the customary cross slide adapted for both in and out movements for the operation on a workpiece by tools held on the front and back of the cross slide. The selector switches 29 and 30 control the direction of rotation of the spindle motor 12 for the in and out positions, respectively, of the cross slide. For the outward movement or reverse movement of the cross slide, the spindle motor 12 would normally be called upon to rotate in a reverse direction, and hence the selector switch 30 is shown in the reverse position. The selector switch 36 has been shown in the off position merely to illustrate a further function of the circuit. One face of the turret may be adapted to carry a threading die or tap, and since it may not always be possible to provide a collapsible tap or an expanding die, the reverse tap relay RT is provided. The reverse tap pickup switch 22 may be momentarily actuated by the movement of the saddle at the proper time whenever the turret face carrying the tap or die is in operation. This actuation of the pickup switch 22 will provide energization to the reverse tap relay RT. This relay is held in through the contact RT2. Since the selector switch 37 is in the reverse position it will change the spindle motor from a forward to a reverse rotational direction. The timer relay T is connected in parallel with the reverse tap relay RT to hold this latter relay energized for a preset time. Such period of time will be governed by the particular threading operation and the time necessary to back the tap or die off the workpiece. When the timer relay T is deenergized, the contact T1 opens to deenergize both the timer and reverse tap relays.

When the switch 16 is closed, the rectifiers 24, 45, 61, and 81 will be energized to energize the entire system. Since the tap switch 14 is in the No. 1 position, the first relay 1 will be energized to close all contacts thereof. This means that the rheostats 52, 67, and 85 are in the circuit for controlling the energization to the spindle motor 12 and feed motor 13. The feed motor relay FM will be energized through the contacts D1, RT5, and FB1, to bring the feed motor 13 up to a speed as set by the rheostat 85. Assuming that the cross slide of the turret lathe is in its neutral position so that neither of the cross slide in or out switches 19 or 20 is actuated, the line 40 will be energized. The auxiliary forward relay AF will thus be energized through the selector switch 31 and contact 1A. The contact AF1 will close to energize the forward relay F, and the contact AF2 will open to prevent energization of the reverse relay R. Since the forward relay F is energized, the spindle motor 12 will come up to a speed dictated by the settings of the rheostats 52 and 67. This is effected by the closing of the contacts F4 and F5 and opening of the contact F3. The contact F2 opens to relieve the short circuit on the control lines 47 and 48, and the contact F1 closes to act as a hold-in contact for the forward relay F. The power feed on the turret carrying saddle is provided by the feed motor 13 at a speed in accordance with the setting of the rheostat 85. As the saddle is retracted after completion of the first work operation, the turret will be indexed, and in so doing the rotary tap switch 14 will rotate until the movable contact 15 is in contact with the second contact of this switch. Since it is a shorting type of contact, both the first and second contacts of this switch will be momentarily closed. The second relay 2 will be energized to close all contacts thereof. With the closing of the contact 2E, there is a closed circuit for energization of the dropout relay D, and hence this relay is energized. The contact D1 opens to open the circuit to the feed motor relay FM, and hence connects the field 92 to the armature 91 in a reverse direction to that formally achieved by the energization of this motor 13, thus the feed motor 13 is dynamically braked. The contact D2 of the dropout relay D opens; however, this has no effect on the circuit at this time since the contact AF1 of the auxiliary forward relay is closed to maintain the forward relay F energized. The contact D3 momentarily closes to give a full field energization condition to the field winding 46 of the spindle motor 12. The movable contact 15 will only momentarily contact the first and second contacts of the tap switch 14, and hence this first relay 1 will next be deenergized. The new speed condition of the spindle motor 12 and feed motor 13 will be dictated by the setting of the rheostats 53, 68, and 86. If the new speed setting of the spindle motor 12 is lower than that dictated by the first position of the turret, then the motor 12 will normally tend to coast down to this new speed. This is because the higher speed of the motor 12 would tend to cause regeneration and attempt to drive current back through the rectifier 61 to the A. C. source 11. Since the rectifier is a device which translates power only unidirectionally, the current cannot go backward through this rectifier. That means that the current through the slowdown relay SD will be zero, and hence the contact SD1 thereof will close to place the dynamic braking resistance 78 across the armature 62. This will rapidly brake the motor 12 to the new speed condition even though both the contacts F3 and R3 are not closed. The braking effect on the motor 12 will continue only so long as the motor is above the speed for which the rectifiers 61 and 45 are set. Thus it will be seen that there is no lost time in changing from one higher speed condition to a lower speed condition.

This dynamic braking of the motor 12 is aided by the dropout relay contact D3 which closes to give full field energization to the field winding 46.

In the circuits of Figures 1 and 2, dash-dot lines have been shown to indicate the mechanical connections between the various relay contacts. These dash-dot lines have been designated by the prime of the number or letter which designates the particular relay.

If the new speed condition as set by the next of the numbered relays is higher than the preceding speed condition of the motor 12, then the greater output of the rectifier will cause rapid acceleration of this motor 12. As long as the speed of the motor 12 is below the base speed, this higher speed condition will be controlled by a greater output of the rectifier 61. Should the rectifier 61 attempt to deliver a current greater than its capacity, then the accelerating relay A will come into play. The relay coil AP of this relay is a parallel or polarizing relay in order to polarize the magnetic core of the relay in a given direction. The series coil AS is in series with the output of the rectifier 61, and if too great a current goes through this coil, then the accelerating relay A is energized to close the contact A1 thereof. This will give a full field energization to the field winding 46, and hence reduce the current requirements of the motor armature 62, thus dropping open the contact A1. If the current requirements from the rectifier 61 are again in excess of a preset amount, the accelerating relay A may again be energized. Thus the contact A1 may chatter a few times in building up the speed of the motor 12 to a new speed setting. However, during this chattering, the motor 12 is accelerating as rapidly as the rectifier 61 can supply current to it without overload, and hence this accelerating relay A acts as an overload preventing device without the disadvantages of having a circuit breaker or fuse open the circuit.

Whenever the switch 16 is closed, the control rectifier 24 will cause energization of the feed motor relay FM through the contacts D1, RT5, and FB1. Energization of this feed motor relay FM will close the contacts FM1 and FM3 to bring the feed motor 13 up to a given speed as set by the feed biasing rheostats 85—90. The voltage across the motor armature 91 will also be applied across the feed brake relay FB to energize same and open the contact FB1. The current limiting resistor 41 has a resistance value sufficiently small to hold energized the feed motor relay FM even though the contact FB1 is open. However, the value of this resistance 41 is great enough to prevent pull in of the feed motor relay FM should the resistance 41 be in the circuit when the feed motor relay FM is supplied with power from the lines 25 and 26. Each time the turret is indexed the dropout relay D will be energized to momentarily open the contact D1. This drops out the feed motor relay FM, and the feed motor 13 is dynamically braked through the contacts FM2 and FM4. When the contact D1 recloses, the feed motor relay FM is supplied with power from the lines 25 and 26 through the resistance 41. Because of the lowered voltage the feed motor relay FM will not pull in until the feed motor 13 has been dynamically braked to a point where the voltage across the armature 91 is low enough to cause the feed brake relay FB to be deenergized, and thus close the contact FB1. The purpose of this feed brake relay FB is so that the feed motor 13 will not coast down to a lower speed condition as determined by the next succeeding rheostat, but will be dynamically braked to the new lower speed thus saving time.

The selector switch 34 has been shown in the forward position, and if the fourth relay 4 is energized, the spindle motor 12 will be rotating in a forward direction. If the cross slide of the turret lathe is made to move outwardly, the pickup switch 20 will be closed to energize the cross slide out relay SR. Since the selector switch 30 is in the reverse position this will mean that the spindle motor 12 must go from forward to reverse rotation. As the cross slide out relay SR is energized, the normally closed contacts SR4 and SR6 open, and the contacts SR3 and SR5 close to put new rheostats in the armature and field energization circuits for the new speed condition of the motor 12. Contact SR1 opens to deenergize the auxiliary forward relay AF. Contact SR2 closes to energize the auxiliary reverse relay AR, opening contact AR1 to deenergize the forward relay F and closing contact AR2 to energize the reverse relay R. Since there is a time when neither the forward nor the reverse relay F or R is energized, the contacts F3 and R3 will close to establish the dynamic braking circuit on the motor 12. Also, the braking relay B having been energized will have opened the contact E1 so that the forward relay F cannot become energized until the armature 62 has been braked to a position where the counter electromotive force is reduced sufficiently to drop out the braking relay B. When the cross slide is returned to the neutral position, the pickup switch 20 will be de-actuated, and hence the cross slide out relay SR is deenergized. The contact SR2 opens to deenergize the auxiliary reverse relay AR although the reverse relay R holds in through the contacts R1 and D2. The contact SR1 closes to energize the auxiliary forward relay AF through the contact 4A and the selector switch 34. The contact AF2 opens to deenergize the reverse relay R, and next the contact AF1 closes to energize the forward relay F.

The selector switch 35 has been shown in the forward position, and the selector switch 36 has been shown in the off position. This has been done merely to illustrate a further function of the dropout relay D. As the tap switch 14 is indexed to cause energization of the sixth relay 6 as well as the fifth relay 5, the closing of the contacts 5E and 6E will energize the dropout relay D. The contact D2 opens but does not change the circuit condition since the forward relay F is held in through the contact AF1. Next, the continued movement of the tap switch 14 will cause deenergization of the fifth relay 5. This will cause simultaneous deenergization of the dropout relay D and the auxiliary forward relay AF. The contact AF1 will open to deenergize the forward relay F before the contact D2 closes, and thus the spindle motor 12 will be braked to a stop since both forward and reverse relays are deenergized.

What is claimed is:

1. A control for a motor with an armature and a field and comprising, armature energization means capable of energizing said armature, control relay means for energizing said motor upon being energized, dynamic braking circuit means including means for disconnecting said armature energization means from said armature and normally closed contact means for connecting a dynamic braking resistance thereacross, a slowdown relay serially connected between said motor armature and said armature energization means, and normally closed contacts of said slowdown relay connected in parallel with said contact means, said field being connected for energization independent of the current flow through said armature.

2. A control for a motor with an armature and comprising, armature energization means capable of energizing said armature, control relay means for energizing said motor upon being energized, dynamic braking circuit means including means for disconnecting said armature energization means from said armature and contact means for connecting a dynamic braking resistance thereacross, control voltage means capable of energizing said control relay means, a braking relay connected across said armature, a normally closed braking relay contactor, circuit means connecting said control relay means in series with said contactor and with said control voltage means, a slowdown relay serially connected between said motor armature and said armature energization means, and normally closed contacts of said slowdown relay connected in parallel with said contact means.

3. A control for a motor with an armature and comprising, armature energization means capable of energizing said armature, control relay means for energizing said motor upon being energized, dynamic braking circuit means including means for disconnecting said armature energization means from said armature and contact means for connecting a dynamic braking resistance thereacross, control voltage means capable of energizing said control relay means, a first holding resistor connected in series with said control relay means and having a resistance value sufficient to prevent pull-in of said control relay means upon subjection of said series combination to said control voltage and insufficient to cause dropout of said control relay means after pull-in thereof, a braking relay connected across said armature, a normally closed braking relay contactor bridging said first holding resistor, a slowdown relay serially connected between said motor armature and said armature energization means, and normally closed contacts of said slowdown relay connected in parallel with said contact means.

4. A control for a turret lathe having a spindle motor with an armature and comprising, an armature rectifier for supplying rectified A. C. power to said armature, control means for controlling the energization of said spindle motor, said control means including switch means, control relay means energizable by said switch means, dynamic braking circuit means including means for disconnecting said armature rectifier from said armature and contact means for connecting a dynamic braking resistance thereacross, control voltage means capable of energizing said control relay means, a first holding resistor connected in series with said control relay means and having a resistance value sufficient to prevent pull-in of said control relay means upon subjection of said series combination to said control voltage and insufficient to cause dropout of said control relay means after pull-in thereof, a braking relay connected across said armature, a normally closed braking relay contactor bridging said first holding resistor, a slowdown relay serially connected between said spindle motor armature and said armature rectifier, and normally closed contacts of said slowdown relay connected in parallel with said contact means.

5. A control for a motor with an armature and comprising, an armature rectifier for supplying rectified A. C. power to said armature, control means for controlling the energization of said motor and hence the speed thereof, said control means including switch means for providing variable speeds to said motor, forward and reverse relays arranged in parallel and selectably energizable by said switch means, dynamic braking circuit means including means for disconnecting said armature rectifier from said armature and contact means for connecting a dynamic braking resistance thereacross, control voltage means capable of energizing said forward or reverse relays, a first holding resistor connected in series with the paralleled forward and reverse relays and having a resistance value sufficient to prevent pull-in of the selected one of said relays upon subjection of said series combination to said control voltage and insufficient to cause dropout of the selected one of said relays after said one of said relays has pulled in, a braking relay connected across said armature, a normally closed braking relay contactor bridging said first holding resistor, a slowdown relay serially connected between said motor armature and said armature rectifier, and normally closed contacts of said slowdown relay connected in parallel with said contact means.

6. A control for a turret lathe having a spindle motor with a field winding and an armature and comprising, an armature rectifier for supplying rectified A. C. power to said armature, a field rectifier for supplying rectified A. C. power to said field winding, a saddle slidable on said lathe, a turret mounted on said saddle and having six indexable positions, control means for controlling the energization of said spindle motor and hence the speed thereof, said control means including switch means having six conditions corresponding to said six indexable positions of said turret for providing variable speeds to said spindle motor in each of said indexable positions, forward and reverse relays selectably energizable by said switch means in any of said six conditions for providing forward or reverse rotation of said spindle motor, dynamic braking circuit means including means for disconnecting said armature rectifier from said armature and contact means for connecting a dynamic braking resistance thereacross, control voltage means capable of energizing said forward or reverse relays, a first holding resistor connected in series with the paralleled forward and reverse relays and having a resistance value sufficient to prevent pull-in of the selected one of said relays upon subjection of said series combination to said control voltage and insufficient to cause dropout of the selected one of said relays after said one of said relays has pulled in, a braking relay connected across said armature, a normally closed braking relay contactor bridging said first holding resistor, a slowdown relay serially connected between said spindle motor armature and said armature rectifier, and normally closed contacts of said slowdown relay connected in parallel with said contact means.

7. In a turret lathe having a spindle and a turret with a given number of indexable positions, the provision of a drive means for driving said spindle, means for controlling the energization supplied to said drive means and including shorting type switch means driven in accordance with the rotation of said turret, forward and reverse auxiliary relays selectively energizable in accordance with the position of said turret, forward and reverse relays selectively energizable by the energization of said forward and reverse auxiliary relays, a hold-in contactor of said forward and reverse relays connected in series with the respectively designated relay, a dropout relay energizable upon the simultaneous contacting of adjacent contacts on said switch means, a normally closed contactor of each of said forward and reverse auxiliary relays connected in series with said reverse and forward relays, respectively, and a normally closed dropout contactor in series with said two hold-in contacts.

8. In a motor control system, means for controlling the energization supplied to said motor and including a movable switch having a plurality of positions and a shorting type of movable contact, a plurality of numbered relays selectively energizable upon closing of the respective contactors on said movable switch, forward and reverse auxiliary relays selectively energizable upon the energization of any of said numbered relays, forward and reverse relays selectively energizable by the energization of said forward and reverse auxiliary relays, a hold-in contactor of said forward and reverse relays connected in series with the respectively designated relay, a dropout relay energizable upon the simultaneous contacting of adjacent contacts on said movable switch, a normally closed contactor of each of said forward and reverse auxiliary relays connected in series with said reverse and forward relays, respectively, and a normally closed dropout relay contactor in series with said two hold-in contacts.

9. In a turret lathe having a spindle and a turret with a given number of indexable positions, the provision of drive means for driving said spindle, means for controlling the energization supplied to said drive means and including rotary switch means driven in accordance with the rotation of said turret, said rotary switch means having said given number of positions and having a shorting type of contact which closes the adjacent succeeding contact before opening the preceding contact, numbered relays selectively energizable upon closing of the respective contactors on said movable switch means, forward and reverse auxiliary relays selectively energizable upon the energization of any of said numbered relays, forward and reverse relays selectively energizable by the energization of said forward and reverse auxiliary relays, a hold-in contactor of said forward and reverse relays connected in series with the respectively designated relay, a dropout relay energizable upon the simultaneous contacting of adjacent contacts on said rotary switch means, a normally closed contactor of each of said forward and reverse auxiliary relays connected in series with said reverse and forward relays, respectively, and a normally closed dropoue relay contactor in series with said two hold-in contacts.

10. A control system for an adjustable speed motor, comprising, means for energizing said motor, means for controlling the energization supplied to said motor and including at least two numbered relays, an auxiliary forward relay having a normally open contact, each of said numbered relays having a normally open contact in series with a selector switch, said selector switches each having an off position and a forward position in which latter position the auxiliary forward relay is adapted to be energized upon closing of the respective normally open contact of one of the numbered relays, a forward relay energizable upon the closing of said auxiliary forward relay normally open contact, a normally open hold-in contact on said forward relay to hold the same energized when once energized, a dropout relay energizable upon the simultaneous energization of two of said numbered relays, and a normally closed contact on said dropout relay connected in series with said hold-in contact to deenergize said forward relay upon the coincidence of open condition of said dropout relay contact and auxiliary forward relay contact.

11. A control system for an adjustable speed motor, comprising, means for energizing said motor, means for controlling the energization supplied to said motor and including movable switch means having positions of a given number, numbered relays of said given number selectively energizable upon the selection of any one of said positions of said switch means, an auxiliary forward relay having a normally open contact, each of said numbered relays having a normally open contact in series with a selector switch, said selector switches each having an off position and a forward position in which latter position the auxiliary forward relay is adapted to be energized upon closing of the respective normally open contact of one of the numbered relays, a forward relay energizable upon the closing of said auxiliary forward relay normally open contact, a normally open hold-in contact on said forward relay to hold the same energized when once energized, said movable switch means being of the shorting type to momentarily close the next adjacent contact before opening the preceding contact, a dropout relay energizable upon the simultaneous actuation of adjacent contacts on said movable switch means, and a normally closed contact on said dropout relay connected in series with said hold-in contact to deenergize said forward relay upon the coincidence of open condition of said dropout relay contact and auxiliary forward relay contact.

12. A control system for a motor, comprising, energization means for said motor, means for controlling the energization supplied to said motor from said energization means and including a shorting type movable switch having contacts of a given plural number, an additional switch, a normally closed contact on said additional switch disposed to disable the control effected by any of the contacts of said movable switch, a normally open contact on said additional switch, selector switches of said given number plus one, having rotational and off positions, circuit means for connecting each of said selector switches to said energization means to control the rotation of said motor, an auxiliary rotational relay energizable by said selector switches when in said rotational position, a normally open contact on said auxiliary rotational relay, a rotational relay, relay energization means, circuit means for connecting said auxiliary rotational relay contact in series with said rotational relay and to said relay energization means for energization of said rotational relay, a normally open hold-in contact on said rotational relay, said shorting type switch adapted to close the next succeeding contact before opening the preceding contact upon movement of the movable element of said movable switch, a dropout relay energizable upon the simultaneous actuation of adjacent contacts on said movable switch, a normally closed dropout relay contact, and circuit means for connecting in series to said relay energization means said dropout relay contact, said rotational relay, and said rotational relay hold-in contact.

13. A control system for an adjustable speed motor, comprising, energization means for said motor, means for controlling the energization supplied to said motor from said energization means and including a shorting type rotary tap switch having six contacts, six numbered relays selectively energizable by the selective actuation of said six contacts on said tap switch, first normally open contacts on said numbered relays adapted, when closed, to establish a predetermined energization supplied to said motor, an additional relay energizable by means other than said tap switch, a normally closed contact on said additional relay disposed to disable said first normally open contacts of said numbered relays, a normally open contact on said additional relay, seven selector switches having a forward and an off position, circuit means for connecting each of said first normally open contacts and said additional relay normally open contact in series with said seven selector switches, respectively, an auxiliary forward relay energizable by said selector switches when in said forward position, a normally open contact on said auxiliary forward relay, a forward relay, relay energization means, circuit means for connecting said forward auxiliary relay contact in series with said forward relay and to said relay energization means for energization of said forward relay, a normally open hold-in contact on said forward relay, said shorting type tap switch adapted to close the next succeeding contact before opening the preceding contact upon movement of the movable element of said tap switch, a dropout relay energizable upon the simultaneous energization of adjacent numbered relays, a normally closed dropout relay contact, and circuit means for connecting in series to said relay energization means said dropout relay contact, said forward relay, and said forward relay hold-in contact.

14. A control system for an adjustable speed motor, comprising, energization means for said motor, means for controlling the energization supplied to said motor from said energization means and including a shorting type rotary tap switch having six contacts, six numbered relays selectively energizable by the selective actuation of said six contacts on said tap switch, first normally open contacts on said numbered relays adapted, when closed, to establish a predetermined energization supplied to said motor, an additional relay energizable by means other than said tap switch, second normally open contacts on said numbered relays for controlling the forward or reverse rotational direction of said motor, a normally closed contact on said additional relay disposed to disable said second normally open contacts of said numbered relays, a normally open contact on said additional relay, seven selector switches having forward and reverse positions, circuit means for connecting each of said second normally open contacts and said additional relay normally open contact in series with said seven selector switches, respectively, forward auxiliary and reverse auxiliary relays selectively energizable by said selector switches when in said forward and reverse positions, respectively, a normally open contact on each of said forward and reverse auxiliary relays, forward and reverse relays, relay energization means, circuit means for connecting said forward and reverse auxiliary relay contacts in series with said forward and reverse relays, respectively, and to said relay energization means for energization of said forward and reverse relays, a normally open hold-in contact on each of said forward and reverse relays, a normally closed contact on each of said forward and reverse auxiliary relays, circuit means for connecting in series for a first series combination said forward relay, said forward relay hold-in contact, and said reverse auxiliary relay normally closed contact, circuit means for connecting in series for a second series combination said reverse relay, said reverse relay hold-in contact, and said forward auxiliary relay normally closed contact, said shorting type tap switch adapted to close the next succeeding contact before opening the preceding contact upon movement of the movable element of said tap switch, a dropout relay energizable upon the simultaneous energization of adjacent numbered relays, a normally closed dropout relay contact, circuit means for connecting in parallel said first and second series combinations, and circuit means for connecting in series to said relay energization means said dropout relay contact and the paralleled first and second series combinations.

15. In a motor control system, means for controlling the energization supplied to said motor and including shorting type plural position switch means, forward and reverse auxiliary relays selectively energizable in accordance with the position of said switch means, forward and reverse relays selectively energizable by the energization of said forward and reverse auxiliary relays, a hold-in contactor of said forward and reverse relays connected in series with the respectively designated relay, a dropout relay energizable upon the simultaneous contacting of adjacent contacts on said switch means, a normally closed contactor of each of said forward and reverse auxiliary relays connected in series with said reverse and forward relays, respectively, and a normally closed dropout contactor in series with said two hold-in contacts.

16. In a motor control system, means for controlling the energization supplied to said motor and including shorting type plural position switch means, a forward auxiliary relay energizable in accordance with the position of said switch means, a forward relay energizable by the energization of said forward auxiliary relay, a hold-in contactor of said forward relay connected in series therewith, a dropout relay energizable upon the simultaneous contacting of adjacent contacts on said switch means, respectively, and a normally closed dropout contactor in series with said hold-in contact.

References Cited in the file of this patent

UNITED STATES PATENTS

| | | | |
|---|---|---|---|
| 1,060,940 | Reed | May 6, | 1913 |
| 2,183,491 | Neuman | Dec. 12, | 1939 |
| 2,262,379 | Austin | Nov. 11, | 1941 |
| 2,521,801 | Mozzanini et al. | Sept. 12, | 1950 |